March 10, 1953  A. G. HELLSTROM  2,630,690
ABSORPTION REFRIGERATION
Filed Dec. 16, 1948  2 SHEETS—SHEET 1
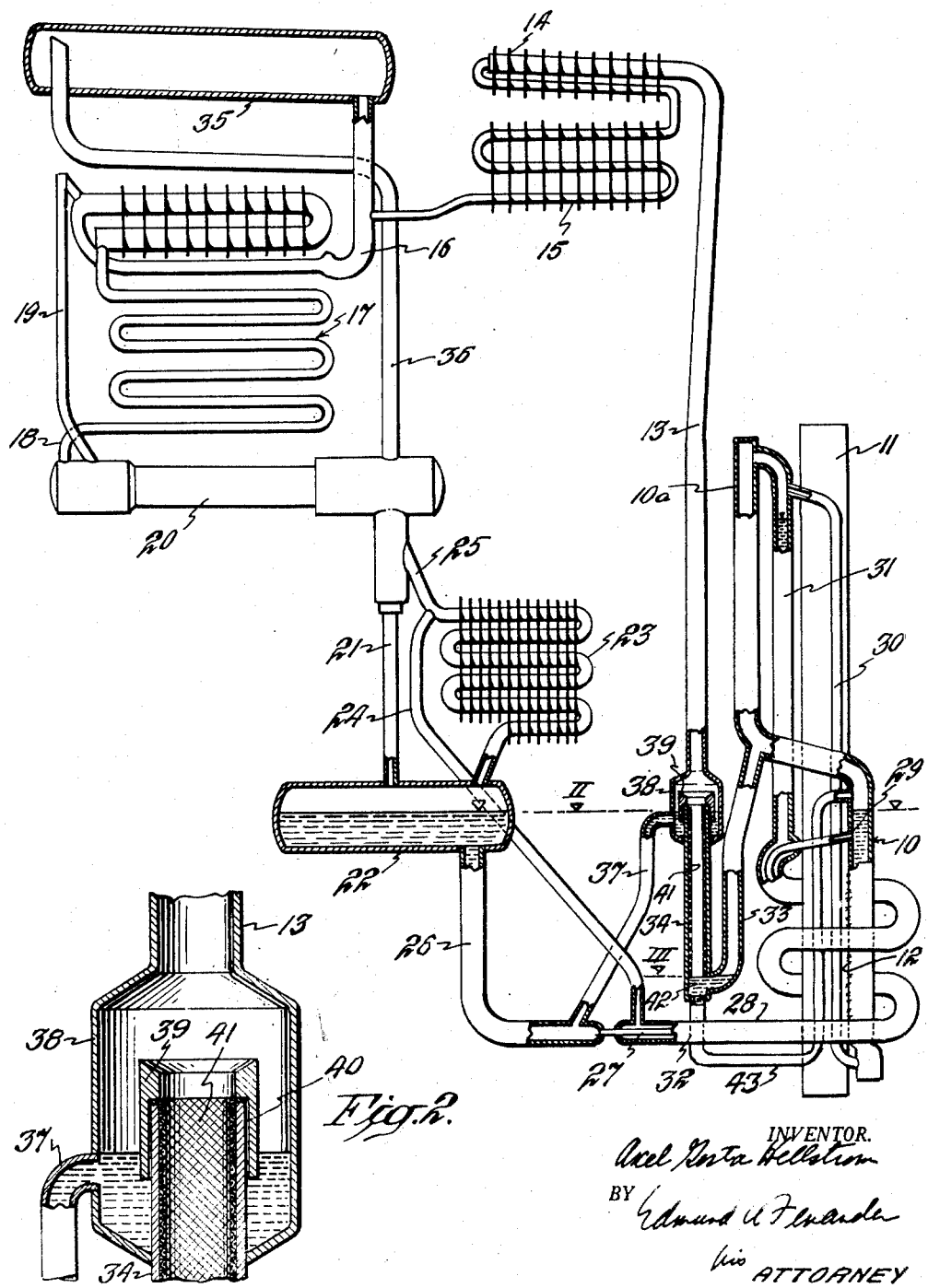

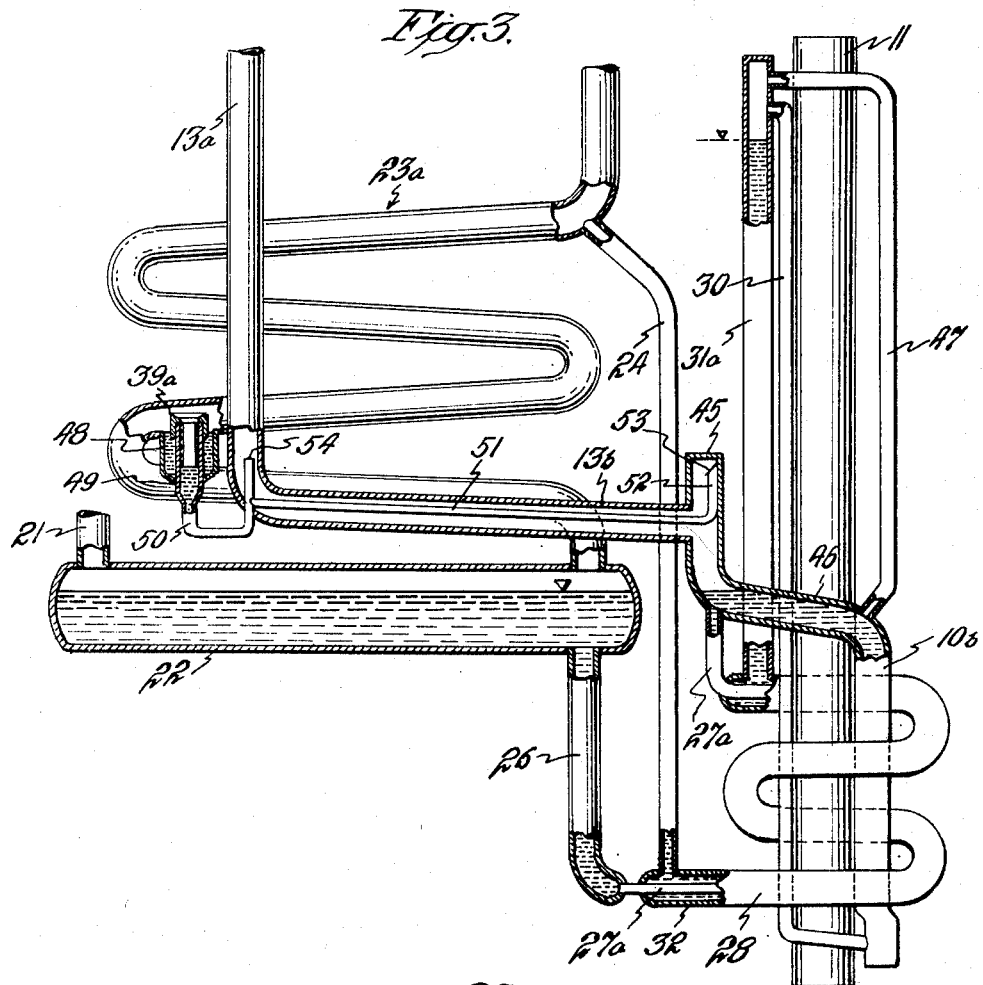

Patented Mar. 10, 1953

2,630,690

UNITED STATES PATENT OFFICE 2,630,690

ABSORPTION REFRIGERATION

Axel Gosta Hellstrom, Evansville, Ind., assignor to Aktiebolaget Elektrolux, Stockholm, Sweden, a corporation of Sweden Application December 16, 1948, Serial No. 65,655
In Sweden December 19, 1947

13 Claims. (Cl. 62—119.5)

My invention relates to refrigeration systems of the absorption type and is especially useful in such systems employing an inert gas or auxiliary pressure equalizing agent.

It is an object to effect improvements in the manner in which fluids are circulated in systems of this type, particularly to provide new arrangements for exchanging heat between the fluids. More particularly, it is an object to provide such new arrangements for exchanging heat between the fluids in which only a part of the rich absorption liquid flowing from the absorber is brought into heat exchange with weak absorption liquid flowing to the absorber so as to effect ideal heat exchange between rich and weak absorption liquids, and in which the remaining part of the rich absorption liquid is brought in heat exchange relation with vapor generated in the boiler or generator.

The novel features which I believe to be characteristic of my invention are set forth with particularity in the claims. The invention, both as to organization and method, together with the above and other objects and advantages thereof, will be better understood by reference to the following description taken in connection with the accompanying drawings forming a part of this specification, and of which:

Fig. 1 diagrammatically illustrates an absorption refrigeration system embodying the invention;

Fig. 2 is an enlarged fragmentary sectional view of parts shown in Fig. 1 to illustrate the invention more clearly;

Fig. 3 is a fragmentary view of a refrigeration system like that shown in Fig. 1 diagrammatically illustrating another embodiment of the invention; and Fig. 4 is an enlarged fragmentary sectional view of parts shown in Fig. 3 to illustrate details more clearly.

Referring to Fig. 1, I have shown my invention in connection with an absorption refrigeration system of a uniform pressure type which is well known in the art and in which an inert pressure equalizing gas is employed. Such a refrigeration system comprises a generator or boiler 10 containing a refrigerant, such as ammonia, in solution in a body of absorption liquid, such as water. Heat is supplied to the boiler 10 from a heating tube or flue 11 thermally connected therewith at 12, as by welding, for example. The heating tube 11 may be heated in any suitable manner, as by an electrical heating element disposed within the lower part of the tube 11 or by a liquid or gaseous fuel burner which is adapted to project its flame into the lower end of the tube.

The heat supplied to the boiler 10 and its contents expels refrigerant vapor out of solution, and, in a manner to be described presently, the refrigerant vapor passes upwardly through a conduit 13 and an air cooled rectifier 14 into an air cooled condenser 15 in which it is condensed and liquefied. Liquid refrigerant flows from condenser 15 through a conduit 16 into a cooling element 17 in which it evaporates and diffuses into an inert pressure equalizing gas, such as hydrogen, which enters through a conduit 18. Due to evaporation of refrigerant fluid into inert gas, a refrigerating effect is produced with consequent absorption of heat from the surroundings.

The rich gas mixture of refrigerant vapor and inert gas formed in cooling element 17 flows from the upper part thereof through a conduit 19, one passage of a gas heat exchanger 20, conduit 21 and absorber vessel 22 into the lower end of an absorber coil 23. In absorber coil 23 the rich gas mixture flows counter-current to downwardly flowing absorption liquid which enters through a conduit 24. The absorption liquid absorbs refrigerant vapor from inert gas, and inert gas weak in refrigerant flows from absorber coil 23 in a path of flow including conduit 25, another passage of gas heat exchanger 20 and conduit 18 into the lower end of cooling element 17.

The circulation of gas in the gas circuit just described is due to the difference in specific weight of the columns of gas rich and weak, respectively, in refrigerant vapor. Since the column of gas rich in refrigerant vapor and flowing from cooling element 17 to the absorber coil 23 is heavier than the gas weak in refrigerant and flowing from the absorber coil 23 to cooling element 17, a force is produced or developed within the system for causing circulation of gas in the manner described.

Absorption solution enriched in refrigerant flows from the absorber vessel 22 through a conduit 26 and an inner pipe or passage 27 of liquid heat exchanger 28 disposed about the lower part of heating tube 11 and the boiler 10. Rich absorption solution passes from the inner pipe 27 into the boiler 10 at a point 29 which is at a level below the liquid level in the absorber vessel 22 and below the level of the liquid column contained in the boiler.

The boiler 10 comprises a vertically extending pipe which is closed at its lower end and to which is connected the lower end of a vapor lift tube 30 which is in thermal contact with the heating tube. Liquid is raised through vapor lift tube 30 by vapor-liquid lift action to the upper part of a standpipe or riser 31 whose lower end is connected to the outer passage or pipe 32 of the liquid heat exchanger 28. The heating tube 11 in normal operation heats enriched absorption solution in the boiler 10 to cause expulsion of refrigerant vapor from solution. The principal part of generated vapor is expelled from solution in boiler 10, and liquid of decreasing concentration flows downwardly to the bottom closed end.

The pipe forming the boiler 10 extends upwardly therefrom and includes a portion 10a alongside the standpipe 31. The upper end of pipe 10a is closed and in communication with the upper end of the standpipe 31. The vapor which passes from the upper end of vapor lift tube 30 into the vapor space of the standpipe 31 flows therefrom into the pipe 10a. Such vapor, together with refrigerant vapor expelled out of solution in boiler 10, flows through a conduit 33 and pipe 34 whose upper end communicates with the lower end of conduit 13 through which vapor is conducted to the condenser 15, as previously explained.

The absorption solution from which refrigerant vapor has been expelled flows from the standpipe 31 through the outer passage 32 of liquid heat exchanger 28 and conduit 24 into the upper part of absorber coil 23. The circulation of absorption solution in the liquid circuit just described is effected by raising of liquid through pipe 30.

The outlet end of condenser 15 is connected by an upper extension of conduit 16, vessel 35 and conduit 36 to a part of the gas circuit, as at one end of gas heat exchanger 20, for example, so that any inert gas which may pass through the condenser 15 can flow into the gas circuit. Refrigerant vapor not liquefied in the condenser flows through the upper part of conduit 16 to displace inert gas in vessel 35 and force such gas into the gas circuit. The effect of forcing gas into the gas circuit in this manner is to raise the total pressure in the entire system whereby an adequate condensing pressure is obtained to insure condensation of refrigerant vapor in condenser 15.

In the liquid heat exchanger 28 heat exchange is effected between relatively cool rich absorption liquid flowing from the absorber vessel 22 and relatively warm weak absorption liquid flowing from the standpipe 31. In refrigeration systems of the type just described the heat capacity of the rich absorption liquid exceeds that of the weak absorption liquid. In other words, when all of the rich absorption liquid flows from the absorber in heat exchange relation with the weak absorption liquid, the weak liquid is not capable of heating the rich liquid to the initial temperature of the weak liquid. Hence, in order to obtain ideal heat exchange between rich and weak absorption liquid, it is desirable to conduct only a part of the rich absorption liquid from the absorber to the liquid heat exchanger so that, as a result of the heat exchange effected in the latter, rich absorption liquid is preheated substantially to the initial temperature of the weak absorption liquid. By giving up heat to the cooler rich absorption liquid, the weak absorption liquid is cooled before entering the upper part of the absorber coil 23 through the conduit 24.

Also, in the operation of the refrigeration system like that just described and illustrated in Fig. 1, the vapor generated in the vapor lift tube and boiler usually is a mixture of refrigerant vapor and absorption liquid vapor; and, when ammonia and water are employed as the refrigerant and absorption liquid, for example, the generated vapor is usually a mixture of ammonia vapor and water vapor. Due to the difference in boiling points of ammonia and water, the water vapor may be removed from ammonia vapor by cooling the mixture to condense out the water.

In accordance with my invention, only a part of the rich absorption solution produced in the absorber is conducted therefrom to the liquid heat exchanger 28 to obtain ideal heat exchange between rich and weak absorption liquids, and the remaining part of the rich absorption liquid is brought into heat exchange relation with generated vapor to effect removal of absorption liquid vapor accompanying the expelled refrigerant vapor. In Fig. 1 I accomplish this by diverting a part of the rich absorption liquid flowing through the conduit 26 into the lower end of a vertically extending conduit 37 which is connected at its upper end to an enlarged section 38 formed at the lower end of the vapor conduit 13. Since the enlarged section 38 is in open communication with the outlet end of the absorber vessel 22, the liquid surface level therein is the same as the liquid surface level in the absorber vessel, as indicated by the line II in Fig. 1.

The vertical pipe 34 extends upwardly into the enlarged section 38, and at the upper open end thereof is positioned a socket or sleeve member 39 which extends downwardly below the liquid surface level II. A small gap is formed between the outer surface of the pipe 34 and the sleeve member 39, and in such gap capillary passages 40 are provided. This may be accomplished, for example, by providing grooves of capillary dimensions at the inner surface of the sleeve member 39. A fine mesh screen 41, which may take the form of wire gauze, is provided at the inner surface of pipe 34, such screen material extending downwardly from the sleeve member 39 to the point in pipe 34 at which the lower end of conduit 33 is connected thereto, as best seen in Fig. 1.

Due to capillary action, rich absorption liquid is drawn upwardly in the passages 40 into the upper end of pipe 34. Such rich absorption liquid is distributed about the entire surface of the screen material 41 so that the latter becomes completely wetted. The rich absorption liquid passes down within the pipe 34 and collects at 42 in the lower ends of pipe 34 and conduit 33. In Fig. 1 it will be seen that in the lower part of the vertically extending pipe 34 a free liquid surface is maintained which is removed from the upper end of the pipe. The capillary liquid lifting provisions at the vicinity of the upper end of pipe 34 effects raising of enriched absorption solution from one level in the enlarged section 38 of such pipe to a region at a higher level from which raised solution flows downwardly in the pipe 34 through the space above the free liquid surface therein.

By properly dimensioning the capillary passages 40 liquid can be drawn into the upper end of pipe 34 at a desired rate from the liquid body in the enlarged section 38. Such desired rate is attained when the part of the rich absorption liquid diverted into conduit 37 enables rich liquid to flow at such a rate that ideal heat exchange is effected between rich and weak liquids in the liquid heat exchanger 28. Under these conditions the thermal capacity of the rich absorption liquid flowing through the liquid heat exchanger 28 will be approximately the same as the thermal capacity of the weak absorption liquid flowing therethrough.

Rich absorption liquid is conducted from the extreme lower end of pipe 34 through a tube 43 which extends vertically upward and is connected at its upper end to boiler 10 at a region above the liquid surface level of the liquid column therein. The tube 43 is in thermal exchange relation with heating tube 11 and flow of liquid therethrough is effected by vapor-liquid lift action under the influence of a reaction head formed by the liquid column in the pipe 34. The liquid surface level of this liquid column, indicated at III in Fig. 1, desirably is adjusted at such a level that the rate at which liquid is raised through the tube 43 equals the rate at which liquid is drawn into the upper end of pipe 34 by capillary action through the passages 40. The tube 43 communicates with the pipe 34 to deliver to boiler 10 enriched absorption solution after flowing downwardly in the pipe 34 above the free liquid surface therein. Further, the tube 43 provides a path of flow for the enriched absorption solution for discharging the latter for gravity flow through the vapor space above the liquid surface level of the liquid in the boiler 10.

Vapor generated in the boiler 10 and vapor lift tube 30, as well as the vapor generated in the vapor lift tube 43, passes into the vapor conduit 33 and depresses the surface level of liquid in pipe 33 so that the vapor bubbles through liquid in the lower part of pipe 34 which can be referred to as an analyzer. The absorption liquid introduced into the analyzer is relatively rich in refrigerant and at a lower temperature than the generated vapor, and in bubbling through the enriched absorption liquid the water vapor is cooled sufficiently and condenses and in this way is removed from the ammonia vapor.

The latent heat of condensation resulting from condensation of water vapor is given up to the enriched absorption solution and forms a heated zone in which some ammonia vapor is expelled out of solution. Such expelled refrigerant vapor mixes with the generated refrigerant vapor and flows upwardly in pipe 34 in heat exchange relation with rich absorption liquid moving downwardly on the fine mesh screen 41. From pipe 34 the refrigerant vapor passes through vapor conduit to the condenser 15, as previously explained.

It will now be understood that one part of the rich absorption liquid flowing from the absorber vessel 22 passes to the liquid heat exchanger 28, and such liquid may be considered as forming the main path of flow of the rich absorption liquid. Such liquid is conducted in the main path of flow to the boiler 10 in which a liquid column is formed. The rich absorption liquid diverted into the conduit 37 is separated from the main path of flow and is conducted in the enlarged section 38 to a vapor space thereinabove the absorption liquid circuit. From such vapor space above the liquid surface level in the enlarged section 38 the separated rich absorption liquid is also conducted to the boiler 10. Hence, the diverted or separated rich absorption liquid is also conducted to the liquid column in the boiler 10, and all of the absorption liquid from such column is raised through the vapor lift tube 30 which in effect serves as a common pump pipe for circulation of all of the absorption liquid in the absorption liquid circuit.

In Figs. 3 and 4 I have shown another embodiment of the invention which differs from the embodiment just described in that the generated vapor does not pass in intimate contact with rich absorption liquid. In Figs. 3 and 4 generated vapor is brought in heat transfer relation with rich absorption liquid while out of physical contact therewith. In order to facilitate an understanding of Figs. 3 and 4, parts similar to those shown in Figs. 1 and 2 are designated by the same reference numerals. In Fig. 3 rich absorption liquid flowing from the absorber vessel 22 passes from the inner pipe 27a of the liquid heat exchanger 28 into a vertically extending pipe 45 at a point which is at a level below the liquid level in the absorber vessel 22 and below the level of the column of liquid contained in the pipe 45.

The extreme lower end of pipe 45 is closed and the lower part or section 10b thereof is in good thermal contact with the heating tube 11, as by welding, for example. A vapor lift tube 30 is in thermal contact with the heating tube 11 and connected at its lower end to the lower end of pipe 45. Liquid is raised by vapor-liquid lift action through tube 30 to the upper part of a standpipe 31a, the lower end of which is connected to the outer passage 32 of liquid heat exchanger 28.

The pipe 45 at a region above the bottom section 10b is formed to provide a horizontally extending section 46. The vapor which passes from the upper end of standpipe 31a flows therefrom through a conduit 47 into the lower end of the horizontal pipe section 46.

In the lower coil of absorber 23a is provided a vessel 48 for collecting absorption liquid flowing through the absorber. A pipe 49 extends upwardly within the vessel 48. To the pipe 49 is secured one leg of a U-shaped conduit 50, the other leg of which extends into a vapor supply conduit 13a. The conduit 13a includes a horizontally extending portion 13b which is connected to the upper section of the pipe 45. A conduit 51 is disposed within the horizontally extending portion 13b of conduit 13a and connected at one end to a leg of U-shaped conduit 50. The opposite end of conduit 51 extends into the upper part of pipe 45 and is formed with an upwardly extending end portion 52 which is fixed, as by welding, to the inner surface of the pipe 45. The opening 53 at the end portion 52 of conduit 51 is below the liquid surface level in the pipe 49, which is indicated at IV in Fig. 4. The leg of U-shaped conduit 50 which projects into the vapor conduit 13a extends upwardly from the region conduit 51 is connected thereto, and the opening 54 at the extreme upper end thereof is at a higher level than the opening 53.

At the upper end of pipe 49 is provided a socket or sleeve member 39a similar to the sleeve member 39 in Figs. 1 and 2. The inner surface of the sleeve member may be formed with capillary grooves to provide capillary passages 40a, and a fine mesh screen 41a is provided at the inner surface of the pipe 49 which extends downwardly from the upper part of sleeve member 39a to a region below the liquid surface level IV in the pipe 49. By suitably dimensioning the capillary passages 40a and the vertical height between the upper edge of pipe 49 and the liquid level V in vessel 48, such a quantity of rich absorption liquid can be diverted from the main path of flow of absorption liquid conducted to the liquid heat exchanger 28 that the thermal capacity of the rich absorption liquid will be approximately the same as the thermal capacity of the weak absorption liquid flowing in heat exchange relation in the heat exchanger.

The diverted absorption liquid is raised by capillary action in the passages 40a into the upper end of pipe 49, and such raised liquid then passes downwardly on the fine mesh screen 41a and collects in the lower part of pipe 49. From pipe 49 absorption liquid passes through the U-shaped conduit 50 into conduit 51. Vapor generated in boiler 10b flows into the upper part of pipe 45 and from the latter into the horizontally extending portion 13b of vapor conduit 13a for flow to the condenser, as in the first described embodiment.

By flowing the generated vapor in heat exchange relation with relatively cool rich absorption liquid, heat is given up by the vapor to the liquid. Such heat transfer is effected while the vapor and liquid are out of physical contact and pass through conduit portion 13b and conduit 51, respectively, in counterflow relation. Due to transfer of heat to rich absorption liquid, refrigerant vapor is expelled out of solution in the conduit 51 and passes therefrom through the opening 54. The heated rich absorption liquid passes from the opening 53 into the horizontally extending portion 46 of the pipe 45.

Since the rich absorption liquid is diverted into the vessel 48 at a higher level than the liquid surface level in the generator pipe 45, the rich absorption liquid passing through the conduit 51 can flow by gravity to the generator or boiler without the necessity of providing special pumping provisions.

In both embodiments described above it will be understood that the capillary liquid provisions provided operate independently of vapors generated in the generator or boiler to effect flow of enriched absorption solution toward the boiler. In Figs. 1 and 2 expelled refrigerant vapor flowing upwardly in conduit 34 by-passes at least the part of the liquid body in the enlarged section 38 which is beneath the free liquid surface level thereof. In Figs. 3 and 4 expelled refrigerant vapor flowing through conduit portions 13b and 13a completely by-passes the liquid body in vessel 48. Hence, in both embodiments expelled refrigerant vapor does not pass through or bubble through the liquid bodies maintained at 38 and 48, respectively. The capillary provisions at each of these liquid bodies segregate liquid and raise such segregated liquid directly upward at the immediate vicinity of the free liquid surface of each body to a higher level removed from such free liquid surface. By lifting liquid in this manner from one level to a higher level, flow of enriched absorption solution toward the boiler is promoted.

While several embodiments of the invention have been shown and described, it will be apparent that modifications and changes may be made without departing from the spirit and scope of the invention, as pointed out in the following claims.

What is claimed is:

1. Refrigeration apparatus of the absorption type including a boiler for generating vapors, an absorber for absorbing vapors, connections for circulation of absorption solution through and between said boiler and absorber, said connections including conduit means for conducting one portion of the solution enriched in said absorber in heat exchange relation with generated vapors and for conducting another portion of the solution enriched in said absorber in heat exchange relation with weak absorption solution flowing from said boiler, and means including a capillary syphon embodied in said conduit means for promoting flow of said one portion of the solution enriched in said absorber.

2. Refrigeration apparatus of the absorption type including a boiler for generating vapors, an absorber for absorbing vapors, connections for circulation of absorption solution through and between said boiler and said absorber, said connections including conduit means for conducting one portion of the solution enriched in said absorber in heat exchange relation with generated vapors and for conducting another portion of the solution enriched in said absorber in heat exchange relation with weak absorption solution flowing from said boiler, and said conduit means including provisions to deliver both portions of said enriched solution in intimate contact with one another in said boiler, said provisions including a vertically extending conduit having a free liquid surface therein which is removed from the upper end thereof and liquid lifting means at the vicinity of the upper end of such conduit for raising said one portion of enriched absorption solution from one level to a region at a higher level from which raised solution flows downwardly in said conduit through the space above the free liquid surface therein.

3. Refrigeration apparatus as set forth in claim 2 also includes a gas lift pump communicating with said conduit to deliver to said boiler said one portion of enriched absorption solution after flowing downwardly in said conduit through the space above the free liquid surface therein.

4. A method of refrigeration which includes expelling refrigerant vapor from solution in absorption liquid at a place of vapor expulsion and thereby produce weak absorption liquid, flowing said weak absorption liquid to a place of absorption to absorb refrigerant vapor and thereby produce rich absorption liquid, flowing expelled refrigerant vapor from the place of vapor expulsion to a place of condensation in a first path of flow, flowing one part of the rich absorption liquid produced at the place of absorption in a second path of flow in heat transfer relation with flowing weak absorption liquid and thereafter to the place of vapor expulsion, flowing another part of the rich absorption liquid produced at the place of absorption in a third path of flow in heat exchange relation with expelled refrigerant vapor in said first path of flow and thence to the place of vapor expulsion in intimate contact with said one part of the rich absorption liquid flowing thereto, maintaining in said third path a flow a body of rich absorption liquid having a free liquid surface, and promoting flow of liquid in said third path of flow toward the place of vapor expulsion by segregating liquid from said liquid body and raising the segregated liquid directly upward at the immediate vicinity of the free liquid surface thereof to a higher level removed from such free liquid surface.

5. A method as set forth in claim 4 in which said other part of the rich absorption liquid in its third path of flow passes in heat exchange relation with expelled refrigerant vapor while the fluids are out of physical contact.

6. A method as set forth in claim 4 in which said other part of the rich absorption liquid, when heat exchange with expelled refrigerant vapor is effected, flows by gravity from a region which is above the surface level of the liquid in said place of vapor expulsion, and raising said other part of the rich absorption liquid to said region by vapor lift action for such gravity flow in said place of vapor expulsion.

7. A method as set forth in claim 4 in which said one part of the rich absorption liquid flows to the place of vapor expulsion at a region below a liquid surface level therein and maintains a liquid column at such place, and said other part of the rich absorption liquid in its third path of flow to the place of vapor expulsion falls by gravity through the vapor space above the liquid surface level of said liquid column.

8. In the art of refrigeration with the aid of an absorption refrigeration system of the inert gas type having a place of heating for generating vapors, an absorber for absorbing vapors, and connections for circulation of absorption solution through and between the place of heating and the absorber, the improvement which comprises flowing one portion of the solution enriched in the absorber in a first path of flow in heat exchange relation with weak absorption solution formed in the place of heating and flowing therefrom to the absorber, subsequently flowing said one portion of enriched solution in the first path of flow to said place of heating, flowing another portion of the solution enriched in the absorber in a second path of flow to the place of heating, maintaining in said second path of flow a body of enriched solution having a free liquid surface, flowing expelled refrigerant vapor from the place of heating in heat exchange relation with said other part of the enriched solution in a path of flow which by-passes at least the part of said body of enriched solution which is beneath the free liquid surface level thereof, and promoting flow of enriched solution in the second path of flow toward the place of heating by raising liquid from said body of enriched solution to a level higher than the free liquid surface thereof.

9. In the art of refrigeration with the aid of an absorption refrigeration system of the inert gas type having a place of heating for generating vapors, an absorber for absorbing vapors, and connections for circulation of absorption solution through and between the place of heating and the absorber, the improvement which comprises flowing one portion of the solution enriched in the absorber in a first path of flow in heat exchange relation with all of the weak absorption solution formed in the place of heating and flowing therefrom to the absorber, subsequently flowing said one portion of enriched solution in the first path of flow to said place of heating, flowing another portion of the solution enriched in the absorber in a second path of flow to the place of heating in intimate contact with said one portion of enriched solution flowing thereto, maintaining in the second path of flow a body of enriched solution having a free liquid surface, flowing expelled refrigerant vapor from the place of heating in heat exchange relation with said other part of the enriched solution in a path of flow which by-passes at least the part of said body of enriched solution which is beneath the free liquid surface level thereof, and promoting flow of enriched solution in the second path of flow toward the place of heating by raising liquid from said body of enriched solution to a level higher than the free liquid surface thereof.

10. Refrigeration apparatus of the absorption type including a boiler for generating vapors, an absorber for absorbing vapors, connections for circulation of absorption solution through and between said boiler and said absorber, said connections including conduit means for conducting one portion of the solution enriched in said absorber in heat exchange relation with generated vapors and for conducting another portion of the solution enriched in said absorber in heat exchange relation with weak absorption solution flowing from said boiler, said conduit means being arranged to deliver both portions of said enriched solution in intimate contact with one another in said boiler, and capillary means embodied in said conduit means which is operable to effect flow only of said one portion of enriched absorption solution.

11. Refrigeration apparatus of the absorption type including a boiler for generating vapors, an absorber for absorbing vapors, connections for circulation of absorption solution through and between said boiler and said absorber, said connections including conduit means for conducting one portion of the solution enriched in said absorber in heat exchange relation with generated vapors and for conducting another portion of the solution enriched in said absorber in heat exchange relation with weak absorption solution flowing from said boiler, said conduit means being arranged to deliver both portions of said enriched solution in intimate contact with one another in said boiler, and capillary means which is operable to effect flow only of said one portion of enriched absorption solution, said last-mentioned means being embodied in said conduit means at the region such solution flows in heat exchange relation with generated vapors, and said conduit means further including a pipe extending downwardly from such capillary means through which generated vapors pass and a heat operated vapor lift tube communicating with the lower end of such conduit for raising only said one portion of enriched solution by vapor lift action to a higher level for gravity flow to said boiler.

12. Refrigeration apparatus of the absorption type including a boiler for generating vapors, an absorber for absorbing vapors, connections for circulation of absorption solution through and between said boiler and said absorber, said connections including conduit means for conducting one portion of the solution enriched in said absorber in heat exchange relation with generated vapors and for conducting another portion of the solution enriched in said absorber in heat exchange relation with weak absorption solution flowing from said boiler, said conduit means being arranged to deliver both portions of said enriched solution in intimate contact with one another in said boiler, and structure embodied in said conduit means which is operable to effect flow only of said one portion of enriched absorption solution, said structure comprising capillary means and a gas lift pump.

13. Refrigeration apparatus of the absorption type including a boiler for generating vapors, an absorber for absorbing vapors, connections for circulation of absorption solution through and between said boiler and said absorber, said connections including conduit means for conducting one portion of the solution enriched in said absorber in heat exchange relation with generated vapors and for conducting another portion of the solution enriched in said absorber in heat exchange relation with weak absorption solution flowing from said boiler, said conduit means being arranged to deliver both portions of said enriched solution in intimate contact with one another in said boiler, and liquid lifting means embodied in said conduit means which is operable independently of vapors generated in said boiler to effect flow toward said boiler of only said one portion of enriched absorption solution, said conduit means providing a path of flow for said one portion of enriched absorption solution for discharging the solution for gravity flow through the vapor space above the liquid surface level of the liquid in said boiler.

AXEL GOSTA HELLSTROM.

REFERENCES CITED

The following references are of record in the file of this patent:

UNITED STATES PATENTS

| Number | Name | Date |
| --- | --- | --- |
| Re. 23,032 | Coons | Aug. 31, 1948 |
| 1,374,952 | Rogers | Apr. 19, 1921 |
| 2,222,548 | Taylor | Nov. 19, 1940 |
| 2,238,138 | Taylor | Apr. 15, 1941 |
| 2,291,695 | Coons | Aug. 4, 1942 |
| 2,329,863 | Thomas | Sept. 21, 1943 |

FOREIGN PATENTS

| Number | Country | Date |
| --- | --- | --- |
| 520,953 | Great Britain | May 8, 1940 |